United States Patent Office 3,749,576
Patented July 31, 1973

3,749,576
PHOTOGRAPHIC LIGHT-SENSITIVE SILVER HALIDE MATERIAL CONTAINING AZO DYES
Bernhard Piller, Marly-le-Petit, Switzerland, assignor to Ciba-Geigy AG, Basel, Switzerland
No Drawing. Filed May 4, 1971, Ser. No. 140,275
Claims priority, application Switzerland, May 5, 1970, 6,689/70
Int. Cl. G03c 1/10
U.S. Cl. 96—99
8 Claims

ABSTRACT OF THE DISCLOSURE

Photographic light-sensitive material, especially for the silver dyestuff bleaching process, containing an azo dyestuff derived (a) from a tetrazo compound of a diamine the amino groups of which are bound to benzene radicals which are linked together in amide-like manner by an organic bridge member and (b) 2-phenylamino-8-hydroxy-mono- or -disulphonic acids, the phenyl residues containing at least one further substituent, but being unsubstituted in at least one position ortho to the —NH- group. These magenta dyestuffs are fast to diffusion, easily soluble in water, insensitive to calcium ions and completely bleachable to white.

---

The subject of the invention are azo dyestuffs of the formula (1)

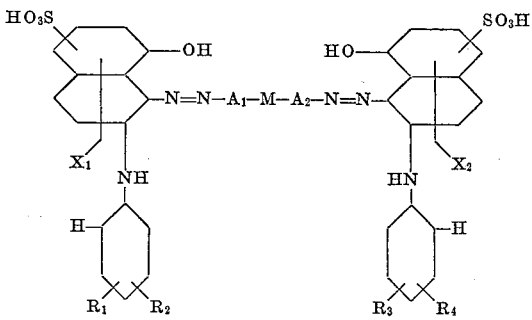

in which $X_1$ and $X_2$ are a sulphonic acid group or preferably a hydrogen atom, $A_1$ and $A_2$ are each a benzene radical, possibly substituted with halogen, low alkyl, low alkoxy or sulphonyl (sulphonic acid group), $R_1$ and $R_3$ are each a halogen atom, a possibly substituted low alkyl, low alkoxy, phenoxy, low alkylcarbonyl, carboxylic acid amide, low alkylsulphonyl group or sulphonic acid amide group or a carboxylic or sulphonic acid group, $R_2$ and $R_4$ are each a hydrogen or halogen atom, a low alkoxy or sulphonic acid group and M is an amide-like organic radical bound to $A_1$ and $A_2$, the azo groups present in the molecule being arranged in the form of a straight chain.

There are to be understood by low groups of the indicated type those with at the most four carbon atoms. Dyestuffs with a linear arrangement of the azo groups are those which contain all azo groups in the following schematic arrangement:

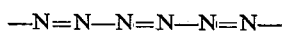

M can be an aliphatic, aromatic or heterocyclic radical, which is bound after the manner of an amide to $A_1$ and $A_2$, or the diamide radicals of carbonic or oxalic acid.

Radicals M bound after the manner of an amide thus correspond to the following formulae:

(2a): —HN—CO—NH—,
(2b): —HN—CO—CO—NH—,
(2c): —HN—CO—M'—CO—NH—,
(2d): —HN—CO—M'—NH—CO—,
(2e): —CO—HN—M'—NH—CO—,
(2f): —HN—SO₂—M'—SO₂—NH—,
(2g): —SO₂—HN—M'—NH—SO₂—, or
(2h): —HN—M"—NH—.

M' represents here an organic radical of the indicated type and M" is a heterocyclic radical having an acid character, such as, e.g., a cyanuric acid radical (1,3,5-triazine radical).

The radicals $R_1$ and $R_3$ can possibly be substituted further, alkyl radicals, e.g., by halogen atoms as in the case of the trifluoromethyl group, carboxylic and sulphonic acid amide radicals by one or two alkyl groups with at the most 4 carbon atoms each.

The dyestuffs of Formula 1 can be both symmetrical and asymmetrical.

Preferred azo dyestuffs correspond to the formula (3)

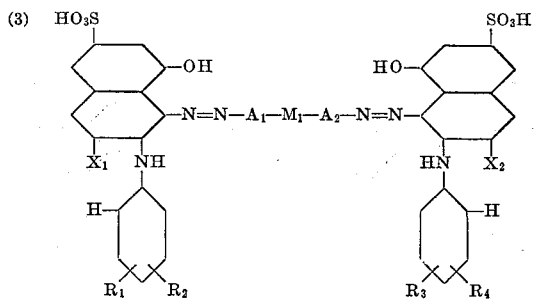

in which $M_1$ is an acid amide-like organic radical (—CO—NH—, —SO₂—NH—)

bound to $A_1$ and $A_2$ and $X_1$, $X_2$, $A_1$, $A_2$, $R_1$, $R_2$, $R_3$ and $R_4$ have the meaning indicated.

Of special interest here are azo dyestuffs of the formula (4)

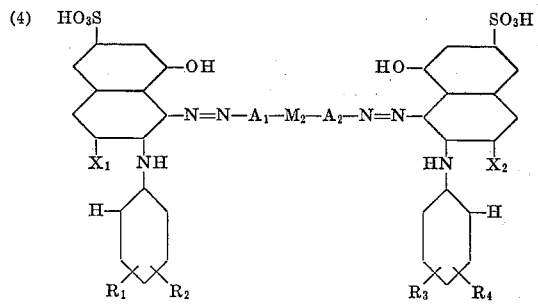

in which $M_2$ is a diamide radical of an at least dibasic acid of organic nature containing carbon, which is bound by the amide nitrogen atoms to $A_1$ and $A_2$ and $X_1$, $X_2$, $A_1$, $A_2$, $R_1$, $R_2$, $R_3$ and $R_4$ have the meaning indicated.

The organic acids from which the radical $M_2$ is derived are aliphatic, in particular however aromatic or heterocyclic disulphonic acids or, principally, dicarboxylic acids.

Azo dyestuffs of the formula (5)
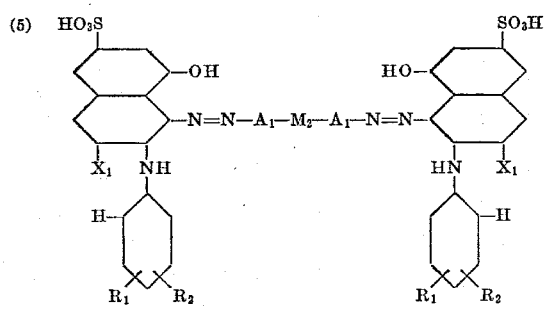

and, above all, those of the formula (6)
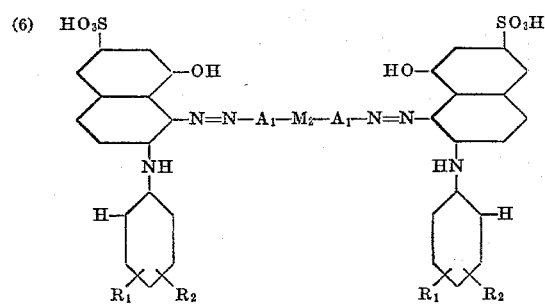

in which $X_1$, $A_1$, $R_1$, $R_2$ and $M_2$ have the meaning indicated, have proved particularly suitable.

Azo dyestuffs of the formula (7)
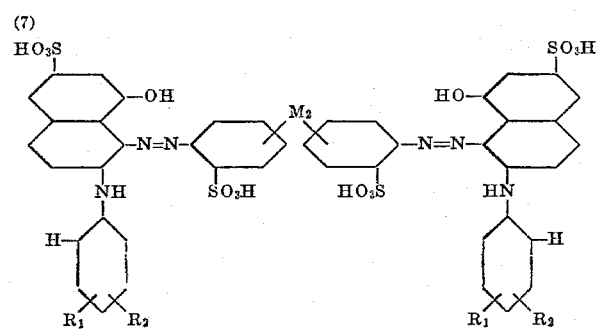

claim a special interest; $R_1$, $R_2$ and $M_2$ have the indicated meaning in them. Advantageous properties are, for example, shown by the azo dyestuffs of the formula (8)
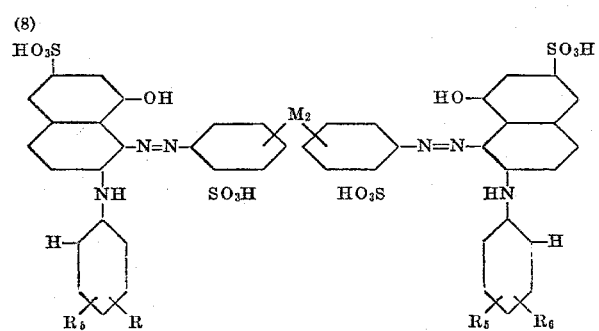

in which $R_5$ is a hydrogen or halogen atom, a methyl, methoxy or sulphonic acid group and $R_6$ is a sulphonic acid group, a methyl carbonyl group or a halogen atom, at most one of the radicals $R_5$ and $R_6$ representing a sulphonic acid group and $M_2$ having the indicated meaning.

As particularly advantageous are to be considered the dyestuffs of the formula (9)
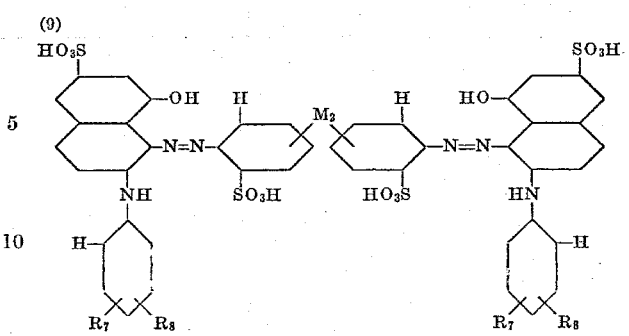

in which $R_7$ is a halogen atom with an atomic number less than 53, a trifluoromethyl group, a methyl carbonyl group, a methyl sulphone group, a sulphonic acid group or a methoxy group, $R_8$ a hydrogen atom, a halogen atom with an atomic number less than 53 or a methyl group and $M_2$ has the meaning indicated.

Further preferred azo dyestuffs correspond to the formula

(10)
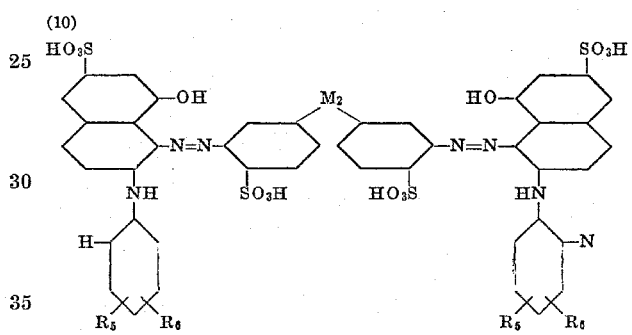

and, in particular, to the formula

(11)
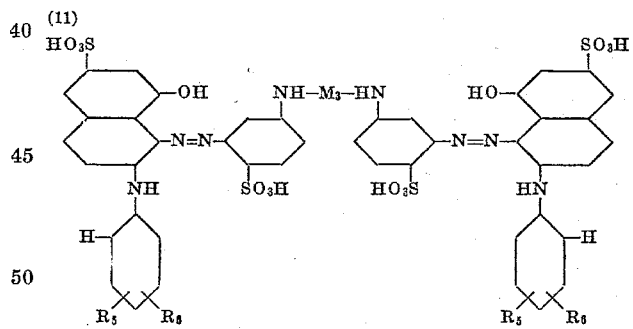

in which $M_3$ is a carbonyl group (—CO—) or a heterocyclic or carbocyclic aromatic dicarbonyl radical and $M_2$, $R_5$ and $R_6$ have the meaning indicated.

Disazo dyestuffs of the formula

(12)
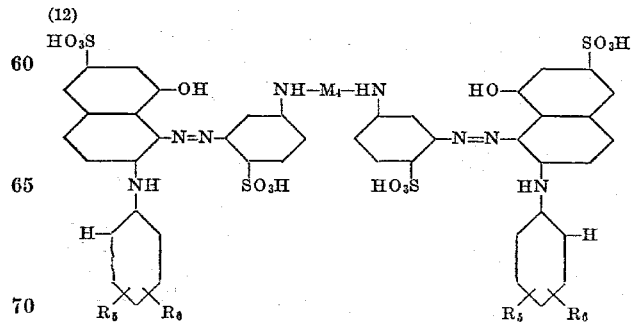

in which $M_4$ is a carbonyl group, a terephthaloyl, isophthaloyl, benzophenone-4,4'-dicarbonyl, diphenylsulphone-4,4'-dicarbonyl, azobenzene-3,3'-dicarbonyl, thiophene-2,4-dicarbonyl or pyridine-2,6 or 3,5-dicarbonyl radical and $R_5$ and $R_6$ have the indicated meaning, are particularly suitable.

Furthermore, disazo dyestuffs of the formula

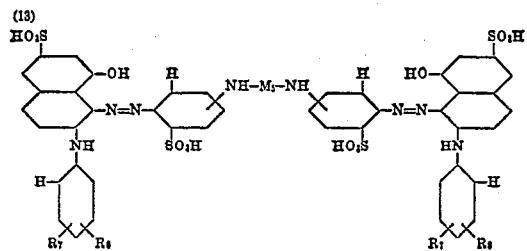

are preferred, in which $M_5$ is a —CO— group or a benzene, benzophenone, diphenylsulphone, diphenyl urea, thiophene or pyridine radical attached to the —NH— groups in each case by a —CO— group, the members of said ring systems attached to the two —CO— groups being separated from one another by at least one further ring member, and in which $R_7$ and $R_8$ have the indicated meaning.

Amongst the dyestuffs of Formula 12 there are, e.g. suitable those of the formula

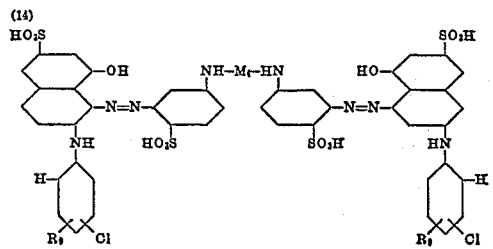

in which $R_9$ is a hydrogen or chlorine atom or a methyl group and $M_4$ has the indicated meaning.

Also of interest are disazo dyestuffs of the formula

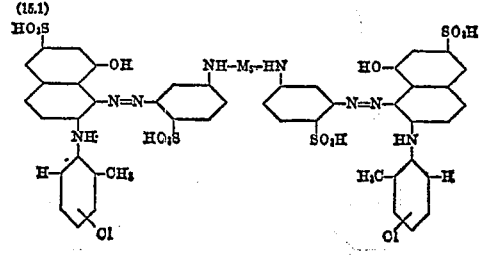

and, above all, of the formula

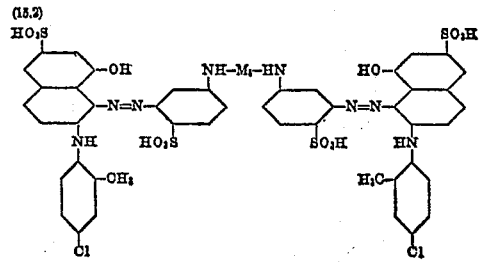

in which $M_5$ is a terephthaloyl, isophthaloyl, pyridine-2,6- or -3,5-dicarbonyl or thiophene- 2,5-dicarbonyl radical.

There may also be mentioned as particularly outstanding embodiments dyestuffs of the formula

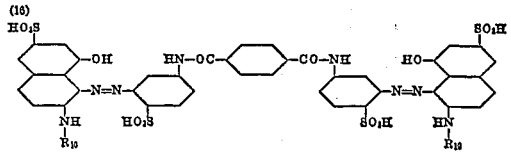

in which $R_{10}$ represents one of the radicals of the formulae

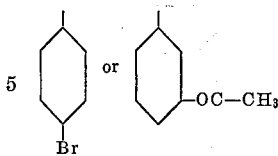

as well as those of the formula

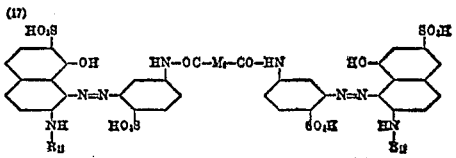

in which $M_6$ is a pyridine radical arranged symmetrically in relation to the bonds to the —CO groups, and $R_{11}$ is one of the radicals of the formulae

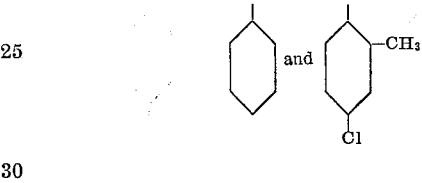

The dyestuffs of the Formulae 1 to 17 can exist not only as indicated in the form of their free acids, i.e. with $HO_3S$ and/or HOOC groups, but also as salts. Depending on the conditions of separation, e.g. the selected pH value or the cation, which the salt used for separation has, the acid groups can be an —$SO_3$— cation and/or a —COO cation, such as, e.g. —$SO_3Na$, —$SO_3K$, (—$SO_3$)$_2Ca$, —COONa, —COOLi, —$COONH_4$ It is preferably therefore a matter of salts of the alkaline earth or, in particular, alkali metal group.

The radicals of the formulae

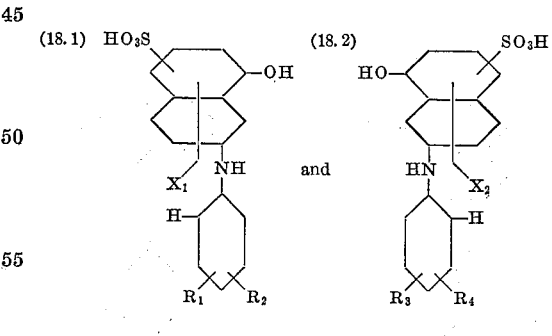

in Formula 1 are derived, e.g. from compounds of the following formulae:

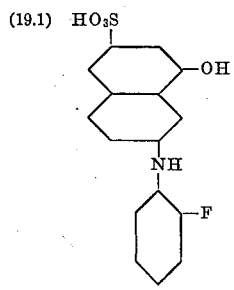 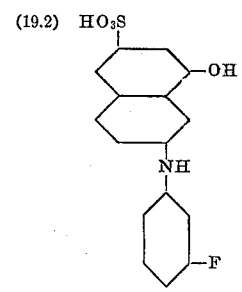

(19.3) 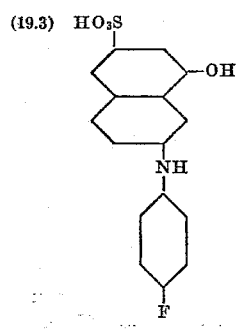
(19.4) 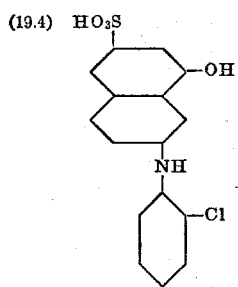
(19.13) 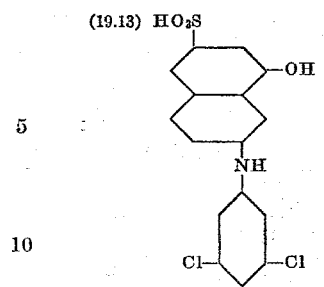
(19.14) 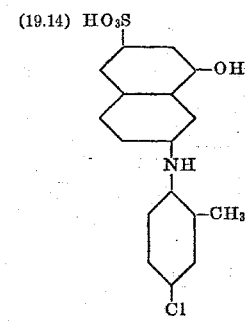
(19.5) 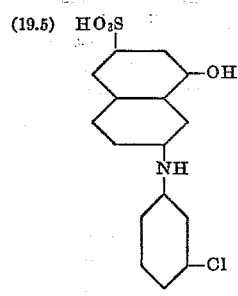
(19.6) 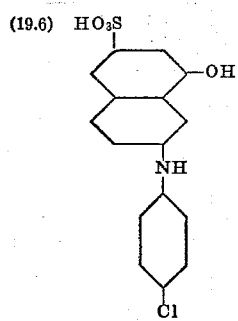
(19.15) 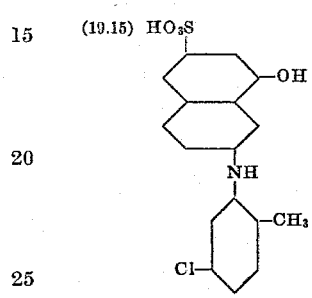
(19.16) 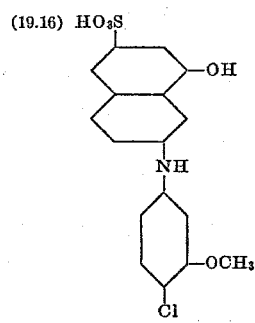
(19.7) 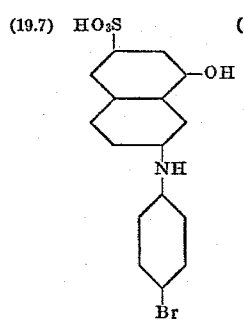
(19.8) 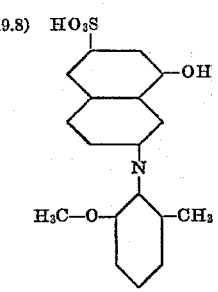
(19.17) 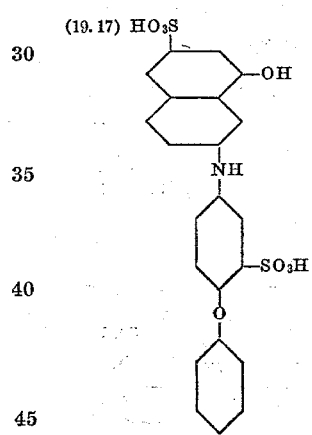
(19.18) 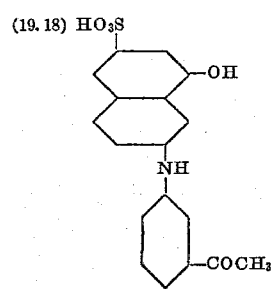
(19.9) 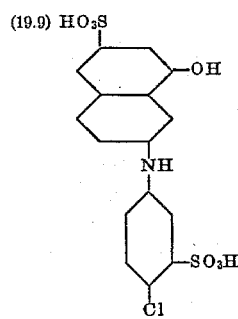
(19.10) 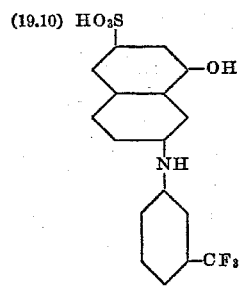
(19.19) 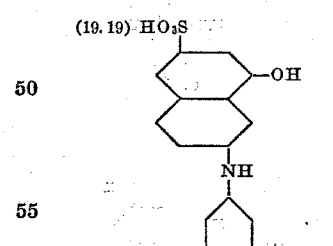
(19.20) 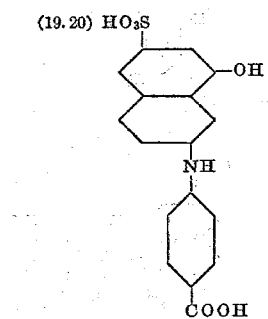
(19.11) 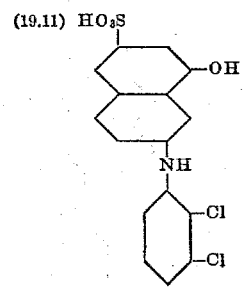
(19.12) 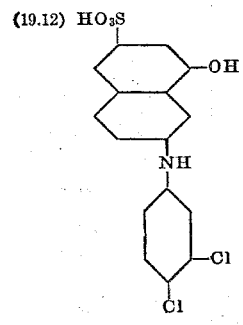
(19.21) 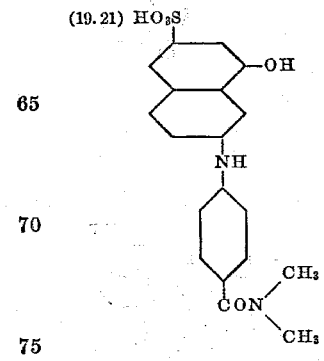
(19.22) 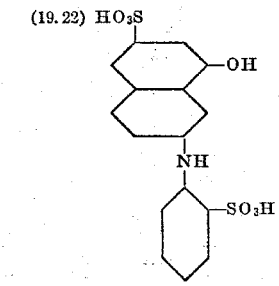

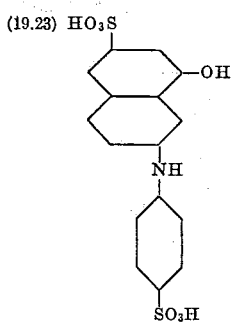 (19.23)

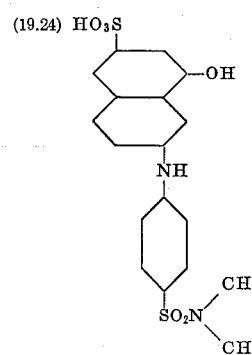 (19.24)

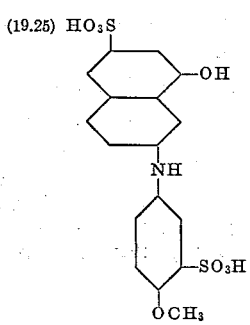 (19.25)

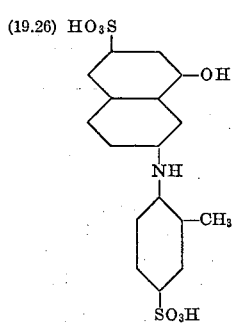 (19.26)

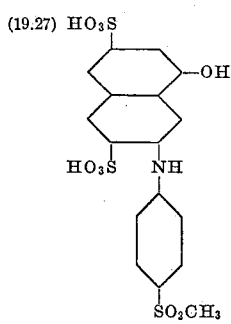 (19.27)

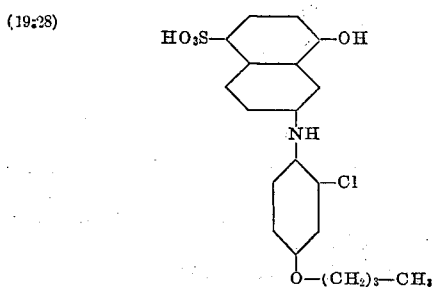 (19.28)

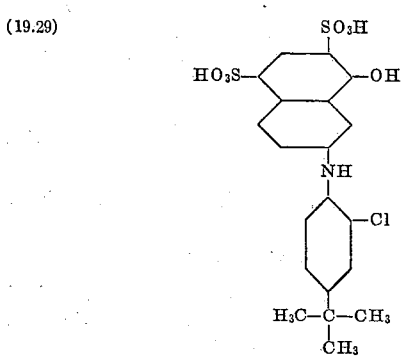 (19.29)

The radicals $A_1$ and $A_2$ as well as $A_1$—M—$A_2$ in Formula 1 are derived, e.g. from the following compounds:

1-amino-4-nitrobenzene,
1-amino-4-nitrobenzene-2-sulphonic acid,
1-amino-4-nitrobenzene-3-sulphonic acid,
1-amino-5-nitrobenzene-2-sulphonic acid,
1-amino-4-acetylaminobenzene-2-sulphonic acid,
1-amino-5-acetylaminobenzene-2-sulphonic acid,
1-amino-2-methyl-4-nitrobenzene,
1-amino-2-methoxy-4-nitrobenzene,
1-amino-2-chloro-4-nitrobenzene,
1-amino-5-methyl-4-nitrobenzene-2-sulphonic acid,
1-amino-2,5-dimethoxy-4-nitrobenzene,
1-amino-2-tertiary butyl-4-nitrobenzene,
1-amino-2-n-butoxy-4-nitrobenzene.

(20.1) 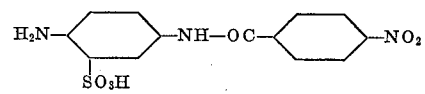

(20.2) 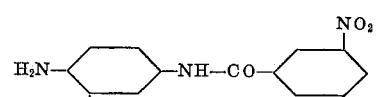

(20.3) 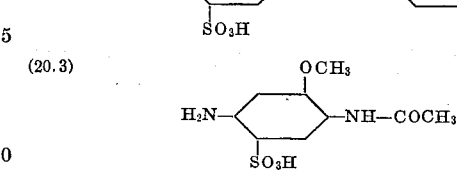

(20.4) 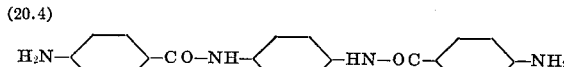

(20.5) 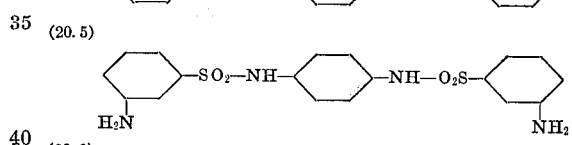

(20.6) 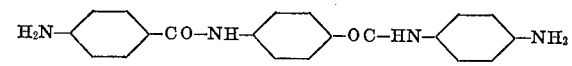

The radical M in Formula 1 is derived from anhydrides and, in particular, from halides of at least dibasic acylation components.

There may, e.g. be mentioned as anhydrides:

succinic acid anhydride,
chlorosuccinic acid anhydride or
glutaric acid anhydride.

The radical M is, however, preferably derived from dihalides, namely, e.g. from:

phosgene,
oxalic acid dichloride,
succinic acid dichloride,
adipic acid dichloride,
thiophosgene,
glutaric acid dichloride,
pimelic acid dichloride,
chlorosuccinic acid dichloride,
2,3-dichlorosuccinic acid dichloride,
fumaric acid dichloride,
terephthaloyl chloride,
isophthaloyl chloride,
5-nitroisophthaloyl chloride,
thiophene-2,5-dicarboxylic acid dichloride,
furane-2,5-dicarboxylic acid dichloride,
pyridine-2,4-dicarboxylic acid dichloride,
pyridine-2,5-dicarboxylic acid dichloride,
pyridine-2,6-dicarboxylic acid dichloride,
pyridine-3,5-dicarboxylic acid dichloride,
azobenzene-3,3'-dicarboxylic acid dichloride,
4,4'-dimethyl-azobenzene-3,3'-dicarboxylic acid dichloride, 4,4'-dichloro-azobenzene-3,3'-dicarboxylic acid dichloride,
azobenzene-4,4'-dicarboxylic acid dichloride,
2,2'-dimethylazobenzene-5,5'-dicarboxylic acid dichloride,
2,2'-dimethoxyazobenzene-5,5'-dicarboxylic acid dichloride,
pyrrole-2,5-dicarboxylic acid dichloride,
2,2'-dichloroazobenzene-5,5'-dicarboxylic acid dichloride,
2,2'-dimethylazobenzene-4,4'-dicarboxylic acid dichloride,
4-methoxyazobenzene-3,4-dicarboxylic acid dichloride,
N,N'-diphenyl-urea-4,4'-dicarboxylic acid dichloride,
3,3'-dichloroazobenzene-4,4'-dicarboxylic acid dichloride,
4-methoxyazobenzene-3,4'-dicarboxylic acid dichloride,
azobenzene-4,4'-disulphonic acid dichloride,
azobenzene-3,3'-disulphonic acid dichloride,
diphenylsulphone-4,4'-dicarboxylic acid dichloride,
benzene-1,3-disulphonic acid dichloride,
diphenylmethane-4,4'-dicarboxylic acid dichloride,
diphenylsulphide-4,4'-dicarboxylic acid dichloride,
4,6-dichloropyrimidine,
1-phenyl-3,5-dichloro-2,4,6-triazine,
1-methoxy-3,5-dichloro-2,4,6-triazine,
diphenylketone-3,4'- or 4,4'-dicarboxylic acid dichloride.

In addition, cyanuryl chloride also comes under consideration.

The dyestuffs of Formula 1 can be prepared by various known processes. An initial process is characterized in that at least one compound of the formula

(21) 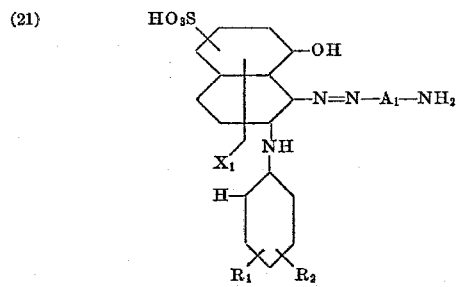

is reacted with a halide or anhydride of an acid of the formula

(22)       HO—$Z_1$—M'—$Z_2$—OH in which $X_1$, $A_1$, $R_1$ and $R_2$ have the indicated meaning, M' is an organic radical and $Z_1$ and $Z_2$ each stand for —CO— or —$SO_2$—.

A second process is characterized in that a bis-diazonium salt of the formula

(23) 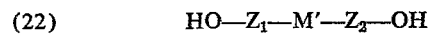

is coupled with at least one compound of the formula

(24) 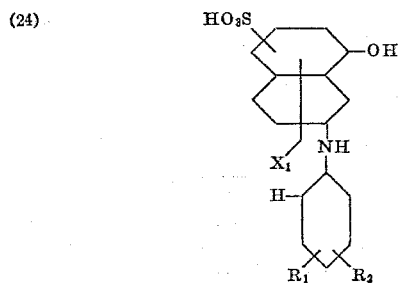

in which $An^{q\ominus}$ in a q-valent anion and $q$ is 1 or 2, and $A_1$, $A_2$, $X_1$, M, $R_1$ and $R_2$ have the indicated meaning.

A third method is also characterized in that a diazonium salt of the formula

(25) 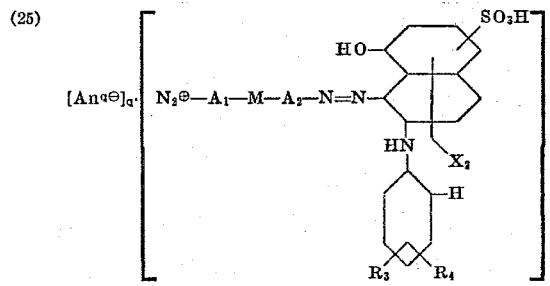

in which $An^{q\ominus}$ $q$, $A_1$, $A_2$, M, $R_3$, $R_4$ and $X_2$ have the indicated meaning, is coupled with a compound of Formula 24.

In the first method, it is desirable to proceed by diazotising a compound of one of the formulae (26.1) $H_2N$—$A_1$—$NO_2$, (26.2) $H_2N$—$A_2$—$NO_2$ (26.3 $H_2N$—$A_1$—NH—D or (26.4) $H_2N$—$A_2$—NH—D in which $A_1$ and $A_2$ have the indicated meaning and D is a protective group capable of being split off, and coupling in an acid medium with a compound of Formula 18.1 or 18.2. After reduction of the nitro group and/or splitting off of the protective group, there is obtained the compound of the formula (27.1) 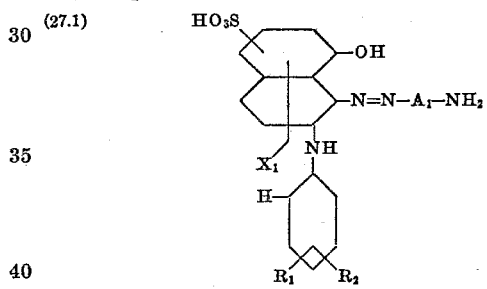

or (27.2) 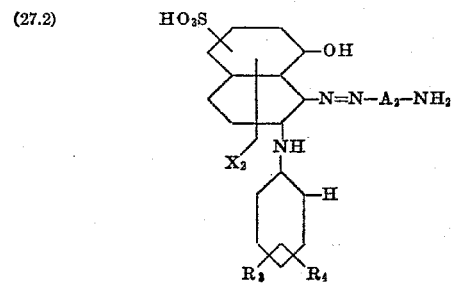

in which $A_1$, $A_2$, $R_1$, $R_2$, $R_3$, $R_4$, $X_1$ and $X_2$ have the indicated meaning. It is now possible either to link 2 mols of the compound of Formula 27.1 or 27.2 with 1 mol bridge member, e.g. of the formula

(28)       Hal—OC—M'—CO—Hal in which M' has the indicated meaning and Hal is a halogen, preferably a chlorine atom to a symmetrical dyesutff of the Formula 1, or to react successively 1 mol each of the compound of Formulae 27.1 and 27.2 with 1 mol bridge member of Formula 28 to an asymmetrical dyestuff of Formula 1.

It is also possible to react a mixture of compounds of Formulae 27.1 and 27.2 with a bridge member of Formula 28.

In the second method, it is preferable to tetrazotise 1 mol diamine of the formula

(29)       $H_2N$—$A_1$—M—$A_2$—$NH_2$ e.g., one of the compounds of the Formulae 20.4, 20.5 or 20.6 and couple with 2 mols compound of Formula 18.1 or 18.2 to the dyestuff of Formula 1.

Finally, it is also possible in the third method to diazotise a compound of the formula (30.1)    $H_2N-A_1-M-A_2-NO_2$ or (30.2)    $H_2N-A_1-M-A_2-NH-D$ e.g., the compound of Formula 20.2, to couple in an acid medium with a compound of Formula 18.1, to reduce the nitro group and/or split off the protective group and, after renewed diazotisation and coupling with a compound of Formula 18.1 or 18.2, to obtain the dyestuff of Formula 1.

The condensation of amines with acid halides and anhydrides takes place according to known methods and is desirably undertaken in a polar solvent such as water or in a polar organic solvent, such as pyridine, methanol, glycol, diethylacetamide, dimethylformamide or N-methylpyrrolidone.

It can also be advantageous to condense in the presence of acid-binding agents, such as e.g. alkali carbonates. Basic solvents such as pyridine or, in particular, N-methylpyrrolidone, themselves act in an acid-binding manner.

The dyestuffs of Formula 1 can be used for various purposes, e.g. in photographic, light-sensitive materials, being here particularly useful as image dyestuffs for the silver colour bleaching process. Accordingly, valuable photographic materials can be prepared in the customary and known manner which contain on a support at least one layer with a dyestuff of Formula 1.

In particular, these dyestuffs can be present in a multiple layer material which contains on a layer support a selectively red-sensitive layer dyed with a green-blue dyestuff, on it a selectively green-sensitive layer dyed purple with a dyestuff of Formula 1 and finally a blue-sensitive layer dyed with a yellow dyestuff. It is however also possible to embed the dyestuffs of Formula 1 in an auxiliary layer or, in particular, in a layer adjacent to the light-sensitive layer.

The dyestuffs of Formula 1 are at the same time very fast to diffusion, easily soluble in water, insensitive to calcium ions and capable of being bleached completely to white.

The dyestuffs in accordance with the invention also offer many possibilities of variation of spectral properties and are characterized by very pure and brilliant shades as well as by a surprisingly high strength of colour.

The extremely favourable course of the spectral absorption curve allows these purple dyestuffs to be combined in various ways with in each case a suitable yellow and blue-green dyestuff. As a result, grey shades which appear neutral are obtained throughout the whole density range for the eye.

The dyestuffs of Formula 1 are characterized in particular by a high degree of light fastness, strength of colour, resistance to diffusion and water solubility, as well as by a colourimetrically favorable form of the absorption spectrum in visible light.

EXAMPLE OF MANUFACTURE (1.1) 11.5 g. 3-aminoacetanilide-4-sulphonic acid are diazotised in 100 ml. water and 10 ml. 35% hydrochloric acid in the normal way at 5° C. with 12.5 ml. 4 N. sodium nitrite solution.

After destruction of the excess nitrite, the diazo solution is added at 5–8° C. and a pH of 3.5 to a suspension of 19.0 g. of a compound of Formula 19.14 in a solution of 10.0 g. crystallised sodium acetate in 100 ml. water. After 3 hours the cooling bath is removed and the mixture is stirred for 12 hours at room temperature.

Heating is carried out for 10 minutes at 65° C. and the dyestuff of the Formula 101.1 which separates out as a dark brown powder is filtered off at 40° C. The yield is almost quantitative.

(101.1)
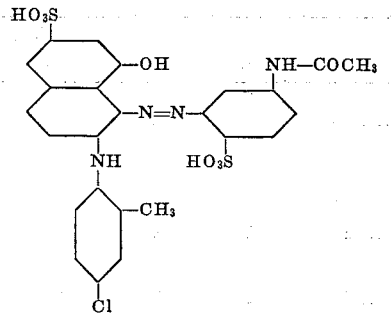

(1.2) 6.1 g. of the product of Formula 101.1 are stirred in a mixture of 50 ml. water and 50 ml. 35% hydrochloric acid for 8 hours at 60° C. Filtering is carried out, then washing successively with water and isopropanol, 4.7 g. (83%) dyestuff of the Formula 101.2 being obtained in the form of a red powder.

(101.2)
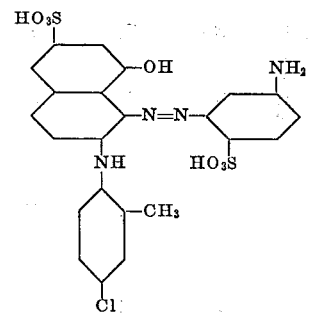

(1.3) 1.1 g. product of Formula 101.2 is dissolving in 25 ml. N-methylpyrrolidone and is reacted at room temperature with in each case 0.1 g. pyridine-2,6-dicarboxylic acid dichloride until no further aminoazo dyestuff can be detected in the thin layer chromatogram.

Precipitation is brought about by the addition of acetone, filtering is carried out and washing with acetone. 0.5 g. dyestuff of the Formula 101 of Table 1 is obtained in the form of a wine-red, thin layer chromatographically uniform powder.

(1.4) The remaining dyestuffs of Table 1 are prepared in a similar way.

In the table:

Column 1 is the formula number
Column 2 is the absorption maximum in nm.
   (a) measured in dimethylformamide/water 1:1
   (b) measured in gelatine.

The radicals $R_{12}$, $R_{13}$, $R_{14}$, $R_{15}$ and $M_7$ are substituents in the formula (100)
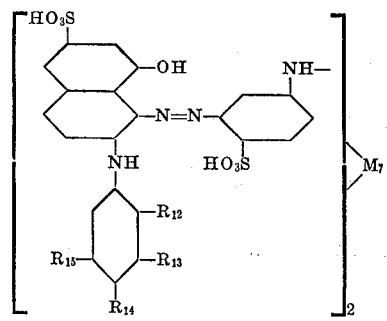

TABLE 1
| (1) | $R_{12}$ | $R_{13}$ | $R_{14}$ | $R_{15}$ | $M_7$ | (2) (a) | (b) |
|---|---|---|---|---|---|---|---|
| 101 | CH₃ | H | Cl | H | 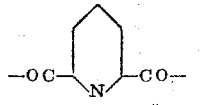 | 526+538 | 536+553 |
| 102 | H | H | F | H | 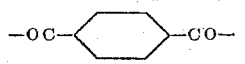 | 537 | 549+553 |
| 103 | Cl | H | H | H | 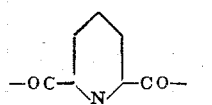 | 518 | 526+544 |
| 104 | Cl | H | H | H | 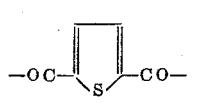 | 518 | 528 |
| 105 | Cl | H | H | H | 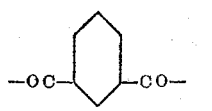 | 524 | 527+540 |
| 106 | Cl | H | H | H | 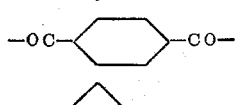 | 520 | 532 |
| 107 | H | Cl | H | H | 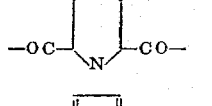 | 534 | 562 |
| 108 | H | Cl | H | H | 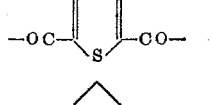 | 531 | 545 |
| 109 | H | Cl | H | H | 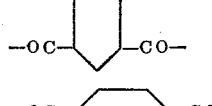 | 531 | 554 |
| 110 | H | Cl | H | H | 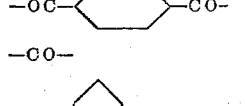 | 531 | 542 |
| 111 | H | H | Cl | H | —CO— | 536 | 548 |
| 112 | H | H | Cl | H | 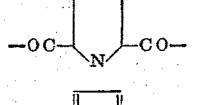 | 537 | 548+568 |
| 113 | H | H | Cl | H | 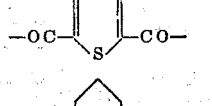 | 535 | 560 |
| 114 | H | H | Cl | H | 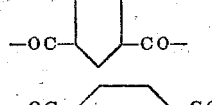 | 533 | 558 |
| 115 | H | H | Cl | H | 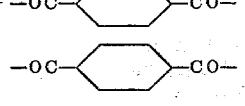 | 534 | 547+558 |
| 116 | H | H | Br | H | 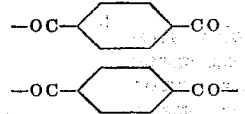 | 538 | 550+577 |
| 117 | H | CF₃ | H | H |  | 527 | 538+560 |
| 118 | H | COCH₃ | H | H | 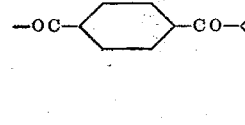 | 536 | 541+560 |
| 119 | H | SO₂CH₃ | H | H |  | 533 | 543+564 |
| 120 | SO₃H | H | H | H | —OC—⬡—CO—⬡—CO— | 498 | 496+539 |

TABLE 1—Continued
| (1) | $R_{12}$ | $R_{13}$ | $R_{14}$ | $R_{15}$ | $M_7$ | (2)(a) | (2)(b) |
|---|---|---|---|---|---|---|---|
| 121 | $SO_2H$ | H | H | H |  | 516 | 526 |
| 122 | H | H | $SO_3H$ | H | 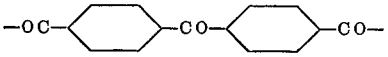 | 538 | 550 |
| 123 | H | H | $SO_3H$ | H | 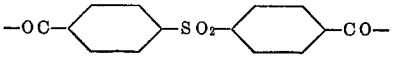 | 537 | 546 |
| 124 | H | Cl | Cl | H | 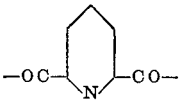 | 531 | 546+568 |
| 125 | H | Cl | Cl | H |  | 531 | 554 |
| 126 | H | Cl | H | Cl | 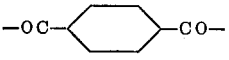 | 532 | 538+564 |
| 127 | $CH_3$ | H | Cl | H | —CO— | 522+535 | 528+547 |
| 128 | H | F | H | H |  | 536 | 544+561 |
| 129 | $CH_3$ | H | Cl | H |  | 525+536 | 540+552 |
| 130 | $CH_3$ | H | Cl | H | 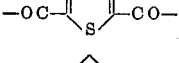 | 525+536 | 538+552 |
| 131 | $CH_3$ | H | Cl | H | 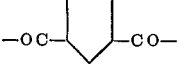 | 531 | 528+547 |
| 132 | $CH_3$ | H | H | Cl |  | 532 | 554 |
| 133 | $CH_3$ | H | H | Cl | 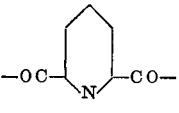 | 526 | 540 |
| 134 | $CH_3$ | H | H | Cl | 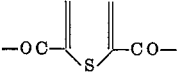 | 524+534 | 532+546 |
| 135 | $CH_3$ | H | H | Cl | 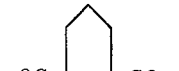 | 524 | 530 |
| 136 | H | $SO_3H$ | Cl | H | 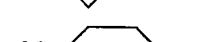 | 532 | 544 |
| 137 | $CH_3$ | H | $SO_3H$ | H |  | 526 | 536 |
| 138 | $CH_3$ | H | $SO_3H$ | H | 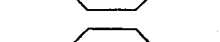 | 526 | 530 |
| 139 | $CH_3$ | H | $SO_3H$ | H |  | 526 | 540+568 |
| 140 | H | H | F | H | 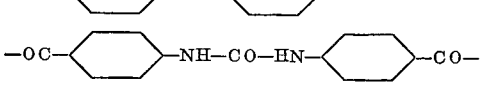 | 537 | 562 |
| 141 | H | H | Br | H |  | 540 | 564 |

TABLE 1—Continued

| (1) | $R_{12}$ | $R_{13}$ | $R_{14}$ | $R_{15}$ | $M_7$ | (2) (a) | (b) |
|---|---|---|---|---|---|---|---|
| 142 | $CH_3$ | H | Cl | H | —OC—⟨pyridine-2,5⟩—CO— | 522+542 | 532+557 |
| 143 | $CH_3$ | H | Cl | H | —OC—⟨pyridine-2,4⟩—CO— | 523+544 | 534+564 |
| 144 | $CH_3$ | H | Cl | H | —OC—⟨pyridine-2,6⟩—CO— | 531 | 560 |
| 145 | $CH_3$ | H | Cl | H | —OC—⟨naphthalene-2,6⟩—CO— | 524+542 | 530+548 |
| 146 | $CH_3$ | H | Cl | H | —OC—⟨phenyl⟩—N=N—⟨phenyl⟩—CO— | 523+544 | 528+545 |
| 147 | $CH_3$ | H | H | Cl | —OC—⟨phenyl⟩—CO— | 527+550 | 540+551 |

There can be prepared in a similar way to that indicated for dyestuff (101) from 4-aminoacetanilide-3-sulphonic acid, amino-naphtholsulphonic acid of Formula 19.14 and thiophene-2-5-dicarboxylic acid dichloride the dyestuff of the formula

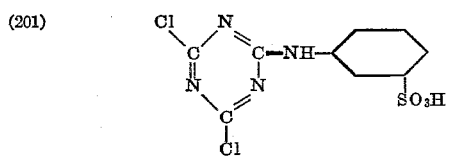

whose absorption maxima, measured in dimethylformamide/water (1:1) are 530 and 552 nm. and, measured in gelatine, 550 and 585 nm.

EXAMPLE 1

There are pipetted into a test tube 3.3 ml. 6% gelatine solution, 2.0 ml. 1% aqueous solution of the hardener of the formula (201)

[structure: dichloro-triazinyl-amino-phenyl sulphonic acid]

1.0 ml. 1% aqueous solution of the purple dyestuff of the Formula 101 and 3.3 ml. silver bromide emulsion which contains 35 g. silver per litre, and the volume is brought up to 10.0 ml. with deionised water. The solution is mixed thoroughly and is kept for 5 minutes on a waterbath at 40° C.

The pouring solution at 40° C. is poured onto a 13 cm. x 18 cm. substrated glass plate. After solidifying at 10° C., the plate is dried in a drying cupboard with circulating air at 32° C.

A strip cut to 3.5 cm. x 18 cm. is exposed under a step wedge through a blue filter Kodak 2b +49 for 3 seconds with 50 lux/cm.²

Then the following process is carried out:

(1) Develop for 10 minutes in a bath which contains per litre 1 g. p-methylaminophenol sulphate, 20 g. anhydrous sodium sulphite, 4 g. hydroquinone, 10 g. anhydrous sodium carbonate and 2 g. potassium bromide;

(2) Soak for 2 minutes;

(3) Stop fix for 6 minutes in a bath which contains per litre 200 g. crystallised sodium thiosulphate, 15 g. anhydrous sodium sulphite, 25 g. crystallised sodium acetate and 13 ml. glacial acetic acid;

(4) Soak for 8 minutes;

(5) Colour bleach for 20 minutes in a bath which contains per litre 27.5 ml. 96% sulphuric acid, 10 g. potassium iodide and 15 ml. of a solution of 0.3 g. 2,3-dimethyl-6-aminoquinoxaline in 50 ml. ethanol;

(6) Soak for 4 minutes;

(7) Bleach residual silver for 8 minutes in a bath which contains per litre 50 g. potassium ferric cyanide, 15 g. potassium bromide, 10 g. disodium phosphate and 14 g. monosodium phosphate;

(8) Soak for 6 minutes;

(9) Fix for 6 minutes as indicated in (3);

(10) Soak for 10 minutes.

A brilliant, light-fast purple wedge is obtained which is completely bleached to white at the point of the originally highest silver density.

Similar results are obtained on using one of the other dyestuffs in Table 1.

EXAMPLE 2

The following layers are applied successively to a white opaque acetate film provided with an adhesive layer:

(1) Red-sensitive silver bromide emulsion in gelatine containing the greenish blue dyestuff of the formula

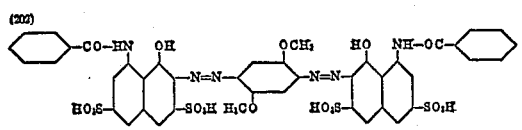

(2) Colourless gelatine layer without silver halide.

(3) Green-sensitive silver bromide emulsion in gelatine containing the purple dyestuff of Formula 129.

(4) Blue-sensitive silver bromide emulsion gelatine containing the yellow dyestuff of the formula

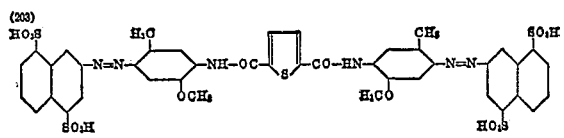

The gelatine layers can also contain additives such as wetting agents, hardeners and stabilisers for the silver halide. For the rest, the method is such that the individual layers contain per square metre of film 0.5 g. of the relevant dyestuff and the amount of silver bromide corresponding to 1 to 1.2 g. silver.

This film is exposed under a coloured slide with red, green and blue copying light. Then the copy is developed according to the instruction given in Example 1.

A light-fast, document-fast, positive image is obtained.

Similar results are obtained if another dyestuff of Table 1 is used in place of the dyestuff of Formula 129.

EXAMPLE 3

There are pipetted into a test tube 3.3 ml. 6% gelatine solution, 2.0 ml. 1% aqueous solution of the hardener of Formula 201, 3.3 ml. silver bromide emulsion, containing per litre 35 g. silver, and 1.4 ml. deionised water.

Thorough mixing is carried out and the tube is kept in a waterbath at 40° C. for 5 minutes.

The pouring solution at 40° C. is poured onto a 13 cm. x 18 cm. substrated glass plate. After solidifying at 10° C., the plate is dried at 32° C. with circulating air in a drying cupboard.

There is then poured onto the dried layer at 40° C. a mixture of 3.3 ml. 6% gelatine solution, 2.0 ml. 1% aqueous solution of the hardener of Formula 201, 0.5 ml. 1% aqueous solution of the purple dyestuff of Formula 130 and 4.2 ml. deionised water.

The result is allowed to solidify and dry as indicated above.

A strip cut to 3.5 cm. x 18 cm. is exposed under a step wedge through a blue filter Kodak 2b +49 for 10 seconds with 50 lux./cm.².

Then the procedure set out in Example 1 is carried out.

A brilliant, very light-fast purple wedge is obtained which is completely bleached to white at the position of the originally highest silver density.

Similar results are obtained if there is used instead of the dyestuff of Formula 130 another dyestuff in Table 1.

EXAMPLE 4

A sample strip made and exposed using the purple dyestuff of Formula 131 in accordance with Example 1 is processed as follows:

(1) Develop for 5 minutes in a bath containing per litre 1 g. p-methylaminophenolsulphate,, 20 g. anhydrous sodium sulphite, 4 g. hydroquinone, 10 g. anhydrous sodium carbonate, 2 g. potassium bromide and 3 g. sodium rhodanide;

(2) Soak for 2 minutes;

(3) Treat for 2 minutes in a reversing bath containing per litre 5 g. potassium bichromate and 5 ml. 96% sulphuric acid;

(4) Soak for 4 minutes;

(5) Treat for 5 minutes in a bath containing per litre 50 g. anhydrous sodium sulphite;

(6) Soak for 3 minutes;

(7) Develop for 4 minutes in a bath containing per litre 2 g. 1-phenyl-3-pyrazolidone, 50 g. anhydrous sodium sulphite, 10 g. hydroquinone, 50 g. anhydrous sodium carbonate, 2 g. sodium hexametaphosphate and 20 ml. of a 1% aqueous solution of tert.-butylaminoborane;

(8) Soak for 2 minutes;

(9) Continue to treat as indicated in (5) to (10) in Example 1.

A brilliant, highly light-fast purple wedge running oppositely to the original pattern is obtained.

Similar results are obtained using one of the remaining dyestuffs of Table 1.

What is claimed is:

1. A photographic light sensitive silver halide material which contains on a support at least one layer with a dyestuff of the formula

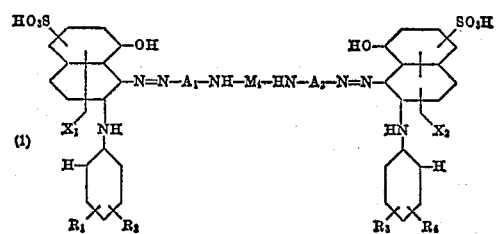

in which $X_1$ and $X_2$ represent a sulfonic acid group or a hydrogen atom, $A_1$ and $A_2$ each represent a benzene radical which is free from further substituents or carries as a further substituent a halogen atom, a lower alkyl group, a lower alkoxy group or a sulfonic acid group, $R_1$ and $R_3$ each represent a halogen atom, a lower alkyl group, a trifluoromethyl group, a lower alkoxy group, a phenoxy group, a lower alkyl carbonyl group, a carboxylic acid amide group, a lower alkylsulfonyl group, a sulfonic acid amide group, a carboxylic acid group or a sulfonic acid group, $R_2$ and $R_4$ each represents a hydrogen atom, a halogen atom, a lower alkoxy group or a sulfonic acid group, and $M_4$ represents a —CO— group, a terephthaloyl group, an isophthaloyl group, a benzophenone-4,4'-dicarbonyl group, a diphenylsulfone-4,4'-dicarbonyl group, a diphenylurea-4,4'-dicarbonyl group, an azo benzene-3,3'-dicarbonyl group, a thiophene-2,5-dicarbonyl group, a pyridine-2,6- or 3,5-dicarbonyl group, the azo groups present in the molecule being arranged in the form of a straight chain.

2. A photographic material according to claim 1, that contains a dyestuff of the formula

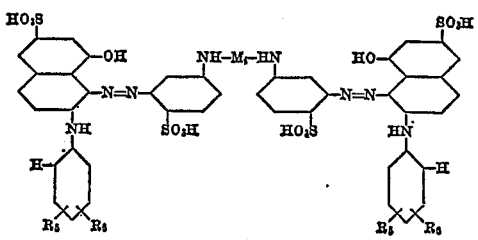

in which $R_5$ represents a hydrogen atom, a halogen atom, a methyl group, a methoxy group, a sulfonic acid group, $R_6$ represents a sulfonic acid group, an $H_3C$—OC— group or a halogen atom, at most one of $R_5$ and $R_6$ standing for a sulfonic acid group.

3. A photographic material according to claim 1, that contains a dyestuff of the formula

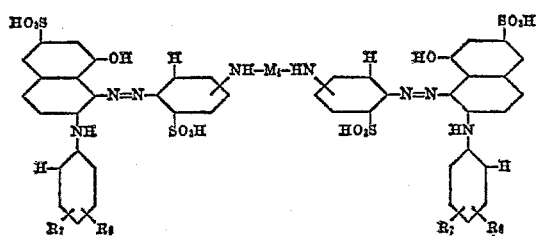

in which $R_7$ represents a halogen atom with an atomic number less than 53, a trifluoromethyl group, an $H_3C$—OC— group, an $H_3C$—$O_2S$— group, a sulfonic acid group or a methoxy group, $R_8$ represents a hydrogen atom, a halogen atom with an atomic number less than 53 or a methyl group.

4. A photographic material according to claim 1, that contains a dyestuff of the formula

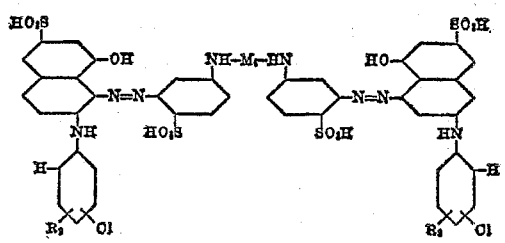

in which $R_9$ represents a hydrogen atom or a chlorine atom or a methyl group and $M_4$ represents a —CO— group, a terephthaloyl group, an isophthaloyl group, a benzophenone - 4,4'-dicarbonyl group, a diphenylsulfone- 4,4' - dicarbonyl group, a diphenylurea - 4,4' - dicarbonyl group, an azo benzene - 3,3' - dicarbonyl group, a thiophene - 2,5 - dicarbonyl group, a pyridine - 2,6- or 3,5 - dicarbonyl group.

5. A photographic material according to claim 1, that contains a dyestuff of the formula

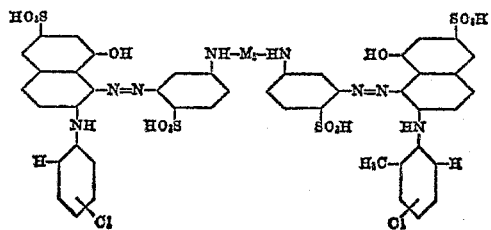

in which $M_5$ represents a terephthaloyl radical, an isophthaloyl radical, a pyridine-2,6- or -3,5-dicarbonyl radical or a thiophene-2,5-dicarbonyl radical.

6. A photographic material according to claim 1, that contains a dyestuff of the formula

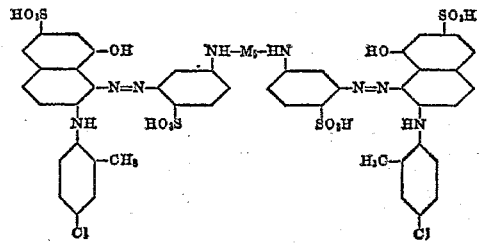

in which $M_5$ represents a terephthaloyl radical, an isophthaloyl radical, a pyridine-2,6- or -3,5-dicarbonyl radical or a thiophene-2,5-dicarbonyl radical.

7. A photographic material according to claim 1, that contains a dyestuff of the formula

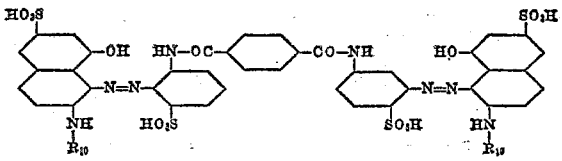

in which $R_{10}$ represents one of the radicals of the formulae

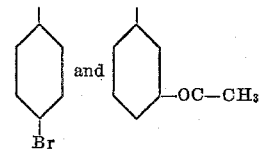

8. A photographic material according to claim 1, that contains a dyestuff of the formula

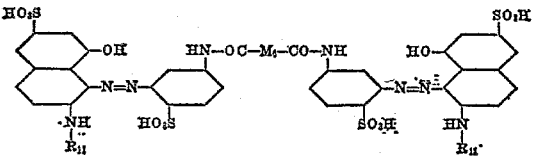

in which $M_6$ represents a pyridine radical arranged symmetrically in relation to the bonds to the —CO— groups and $R_{11}$ represents one of the radicals of the formulae

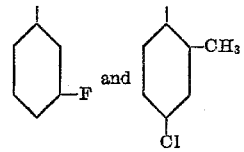

References Cited
UNITED STATES PATENTS
3,454,402  7/1969  Anderau _____ 96—99
3,655,388  4/1972  Piller _____ 96—99

J. TRAVIS BROWN, Primary Examiner

U.S. Cl. X.R.
96—73; 260—152, 156, 169, 174